United States Patent
Kimura et al.

(10) Patent No.: US 9,450,451 B2
(45) Date of Patent: *Sep. 20, 2016

(54) PHOTOVOLTAIC GENERATION SYSTEM AND POWER FEEDING SYSTEM

(75) Inventors: Misao Kimura, Fuchu (JP); Yasuhiro Noro, Hino (JP); Hideki Hayashi, Kawasaki (JP); Kazuya Omata, Uenohara (JP); Toshiaki Asano, Asaka (JP); Yoshio Ebata, Fuchu (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 423 days.

This patent is subject to a terminal disclaimer.

(21) Appl. No.: 13/610,152

(22) Filed: Sep. 11, 2012

(65) Prior Publication Data

US 2013/0241292 A1   Sep. 19, 2013

Related U.S. Application Data

(63) Continuation of application No. PCT/JP2011/053708, filed on Feb. 21, 2011.

(30) Foreign Application Priority Data

Mar. 12, 2010 (JP) .................................. 2010-056638

(51) Int. Cl.
  *H02J 9/00* (2006.01)
  *H02M 7/42* (2006.01)
  (Continued)

(52) U.S. Cl.
  CPC .. *H02J 9/00* (2013.01); *H02J 3/40* (2013.01); *H02J 3/48* (2013.01); *H02M 7/42* (2013.01);
  (Continued)

(58) Field of Classification Search
  CPC ........................................................ H02J 9/00
  USPC .......................................................... 307/66
  See application file for complete search history.

(56) References Cited

U.S. PATENT DOCUMENTS

| 4,636,931 A | 1/1987 | Takahashi et al. |
| 5,268,832 A | 12/1993 | Kandatsu |

(Continued)

FOREIGN PATENT DOCUMENTS

| CN | 101479928 A | 7/2009 |
| CN | 101841160 A | 9/2010 |

(Continued)

OTHER PUBLICATIONS

U.S. Appl. No. 13/543,112, filed Jul. 6, 2012, Ebata et al.

(Continued)

*Primary Examiner* — Rexford Barnie
*Assistant Examiner* — Daniel Kessie
(74) *Attorney, Agent, or Firm* — Foley & Lardner LLP

(57) ABSTRACT

According to one embodiment, a system includes a battery to charge power and discharge a direct-current power to a converter, the converter supplying the converted power to a power system, detectors detecting a voltage at a point between the converter and power system, a current output from the converter and effective power from the voltage value and a current value detected, units computing an angular frequency of the voltage output from the converter, based on an effective power value and an output target value of effective power and an output voltage target value of the converter, based on a current value, a set voltage value and an angular frequency, and a controller controlling the converter according to the output voltage target value.

18 Claims, 8 Drawing Sheets

(51) Int. Cl.
*H02J 3/40* (2006.01)
*H02J 3/48* (2006.01)
*H02J 3/38* (2006.01)
*H02J 3/28* (2006.01)

(52) U.S. Cl.
CPC ........ *H02J 3/28* (2013.01); *H02J 3/383* (2013.01); *Y02E 10/563* (2013.01); *Y02E 10/566* (2013.01); *Y10T 307/625* (2015.04)

(56) References Cited

U.S. PATENT DOCUMENTS

| | | | |
|---|---|---|---|
| 7,116,010 B2 * | 10/2006 | Lasseter et al. | 307/45 |
| 7,932,637 B2 * | 4/2011 | Lasseter et al. | 307/69 |
| 2001/0012211 A1 | 8/2001 | Hasegawa et al. | |
| 2004/0051387 A1 | 3/2004 | Lasseter et al. | |
| 2009/0310390 A1 * | 12/2009 | Ohshima et al. | 363/71 |
| 2010/0207456 A1 | 8/2010 | Lasseter et al. | |
| 2010/0256970 A1 | 10/2010 | Heese et al. | |
| 2010/0327657 A1 | 12/2010 | Kuran | |
| 2012/0173031 A1 | 7/2012 | Parameswaran et al. | |
| 2012/0235498 A1 | 9/2012 | Johnson et al. | |
| 2013/0241292 A1 | 9/2013 | Kimura et al. | |

FOREIGN PATENT DOCUMENTS

| | | | |
|---|---|---|---|
| CN | 101902050 A | | 12/2010 |
| DE | 102006047792 A1 | | 4/2008 |
| EP | 1 801 950 A2 | | 6/2007 |
| JP | 07-163054 A | | 6/1995 |
| JP | 2001-211548 A | | 8/2001 |
| JP | 2001-292531 A | | 10/2001 |
| JP | 2002-017044 A | | 1/2002 |
| JP | 2005-094921 A | | 4/2005 |
| JP | 2005-102357 A | | 4/2005 |
| JP | 2005-539476 A | | 12/2005 |
| JP | 2006-146525 A | | 6/2006 |
| JP | 2007-082361 A | | 3/2007 |
| JP | 2007-244068 A | | 9/2007 |
| JP | 2007-318833 A | | 12/2007 |
| JP | 4170565 B2 | | 10/2008 |
| JP | 2009-213319 A | | 9/2009 |
| JP | 2009-225599 A | | 10/2009 |
| JP | 2011-8348 A | | 1/2011 |
| TW | M337931 | | 8/2008 |
| WO | WO-2010/000664 A2 | | 1/2010 |
| WO | WO-2010/014073 A1 | | 2/2010 |

OTHER PUBLICATIONS

U.S. Appl. No. 13/939,668, filed Jul. 11, 2013, Kimura et al.
Non-Final Office Action issued in co-pending U.S. Appl. No. 13/543,112 mailed Mar. 20, 2015. (18 pages).
Kimura et al.: Notice of Allowance dated Mar. 29, 2016 as received in corresponding U.S. Appl. No. 13/939,668.
Office Action issued in corresponding Arab States of the Gulf application No. GC 2011-17932 dated Dec. 10, 2015 (with English translation).
Driesen J et al: "Virtual synchronous generators", Power and Energy Society General Meeting-Conversion and Delivery of Electrical Energy in the 21st Century, IEEE, Jul. 20, 2008, pp. 1-3.
Extended European Search Report issued in EP 11753137.6 dated Aug. 19, 2015.
Qing-Chang Zhong et al: "Static synchronous generators for distributed generation and renewable energy", Power Systems Conference and Exposition, IEEE/PES, Mar. 15, 2009, pp. 1-6.
US Notice of Allowance dated Jul. 14, 2015 issued in U.S. Appl. No. 13/543,112.
Van Thong V et al: "Virtual Synchronous generator: Laboratory scale results and field demonstration", Powertech, Jun. 28, 2009, IEEE Bucharest, pp. 1-6.

* cited by examiner

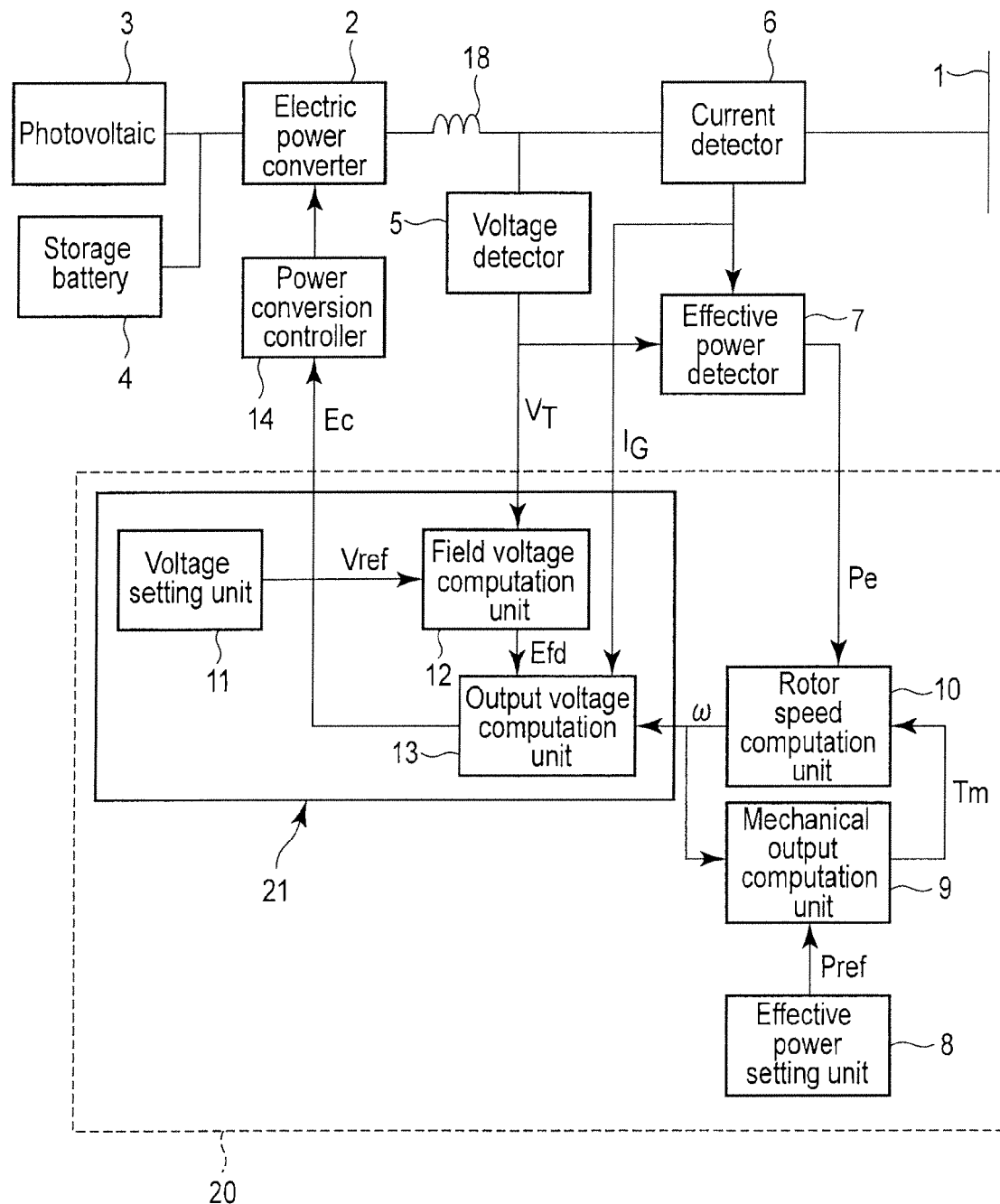
F I G. 1

PHOTOVOLTAIC GENERATION SYSTEM AND POWER FEEDING SYSTEM

CROSS REFERENCE TO RELATED APPLICATIONS

This application is a Continuation Application of PCT Application No. PCT/JP2011/053708, filed Feb. 21, 2011 and based upon and claiming the benefit of priority from Japanese Patent Application No. 2010-056638, filed Mar. 12, 2010, the entire contents of all of which are incorporated herein by reference.

FIELD

Embodiments described herein relate generally to a photovoltaic generation system and power feeding system.

BACKGROUND

Photovoltaic generation is subject to long-time or short-time fluctuates in the amount of generated power depending on the amount of solar irradiation, and stable power supply is difficult as compared with a conventional power generation system such as thermal power generation. A synchronous generator used in thermal power generation has the potential to prevent fluctuations in a system frequency, and has a speed governor to adjust generated power when a system frequency fluctuates, stabilizing a system frequency. On the other hand, a power generation system combining a photovoltaic generation module and an electric power storage unit is not provided with such a frequency adjustment function as the one provided in a synchronous generator to prevent fluctuations in a system frequency. Therefore, if a number of such power generators is installed in a power system, stabilization of a system frequency will become difficult.

There has been proposed a power generation system which maintains constant total effective power of a photovoltaic generation module and storage battery constant, or a method of preventing a short-time fluctuation in the output of a photovoltaic generation module, by combining an electric power storage unit represented by a storage battery and a photovoltaic generation module.

BRIEF DESCRIPTION OF THE DRAWINGS

FIG. 1 is a block diagram for explaining an example of a configuration of a photovoltaic generation system according to a first embodiment;

DETAILED DESCRIPTION

Figure 2A:
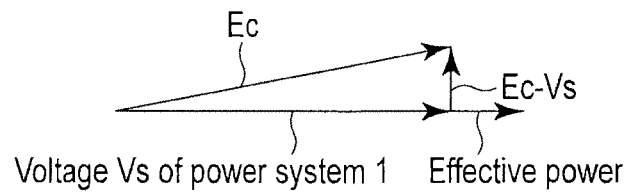
FIG. 2A is a diagram showing an example of the relationship between the output voltage and effective power of a solar power generation system.

In general, according to one embodiment, a photovoltaic generation system includes a direct-current power supply, which includes a photovoltaic, and a storage battery to charge the power from the photovoltaic, and discharge a direct-current power to an electric power converter; the electric power converter configured to convert a direct-current power output from the direct-current power supply, and supply the converted power to a power system; a voltage detector configured to detect a voltage at a connection point between the electric power converter and power system; a current detector configured to detect a current output from the electric power converter; an effective power detector configured to detect effective power from a voltage value detected by the voltage detector and a current value detected by the current detector; a rotor speed computation unit configured to compute an angular frequency of the voltage output from the electric power converter, based on an effective power value detected by the effective power detector, and an output target value of effective power; an electrical characteristics computation unit configured to compute an output voltage target value of the electric power converter, based on a current value detected by the current detector, and a set voltage value; and a power conversion controller configured to control the electric power converter according to the output voltage target value.

According to an aspect of the one embodiment, a power feeding system includes a direct-current power supply including a storage battery which charges power, and discharges a direct-current power to an electric power converter; the electric power converter which converts a direct-current power output from the direct-current power supply, and supplies the converted power to a power system; a voltage detector configured to detect a voltage at a connection point between the electric power converter and power system; a current detector configured to detect a current output from the electric power converter; an effective power detector configured to detect effective power from a voltage value detected by the voltage detector and a current value detected by the current detector; a rotor speed computation unit configured to compute an angular frequency of the voltage output from the electric power converter, based on an effective power value detected by the effective power detector and an output target value of effective power; an electrical characteristics computation unit configured to compute an output voltage target value of the electric power converter, based on a current value detected by the current detector and a set voltage value; and a power conversion controller configured to control the electric power converter according to the output voltage target value.

Hereinafter, a photovoltaic generation system and power feeding system according to a first embodiment will be explained in details with reference to the accompanying drawings. As shown in FIG. 1, a photovoltaic generation system according to the embodiment comprises a direct-current power supply provided with a photovoltaic 3 and a storage battery 4 storing the power generated by the photovoltaic 3; an electric power converter 2 which converts a direct current output from the photovoltaic 3 and storage battery 4 into an alternating-current power, and is connected to a power system 1 through a smoothing reactor 18; a voltage detector 5 which is placed close to a connection point between the electric power converter 2 and power system 1, and detects a voltage at the connection point; a current detector 6 which is placed at a connection point between the electric power converter 2 and power system 1, and detects a current output from the electric power converter 2; an effective power detector 7 which detects effective power from voltage and current values detected by the voltage detector 5 and current detector 6; a power conversion controller 14 which controls the operation of the electric power converter 2; and a power generator characteristics computation unit 20 which supplies the power conversion controller 14 with an output voltage target Ec that is a sine wave.

The voltage detector 5 is connected close to the smoothing reactor 18 between the smoothing reactor 18 and power system 1. The current detector 6 is connected in series between the power system 1 and electric power converter 2. The effective power detector 7 is supplied with the outputs of the voltage detector 5 and current detector 6.

The power generator characteristics computation unit 20 comprises an effective power setting unit 8, a mechanical output computation unit 9 which is supplied with output values of the effective power setting unit 8 and rotor speed computation unit 10, a rotor speed computation unit 10 which is supplied with an output value Pe of the effective power detector 7 and an output value Tm of the mechanical output computation unit 9, a field voltage computation unit 12 which is supplied with an output value Vref of the voltage setting unit 11 and an output value (a close voltage value) $V_T$ of the voltage detector 5, and an output voltage computation unit 13 which is supplied with an output value $I_G$ of the current detector 6, an output value ω of the rotor speed computation unit 10, and an output value Efd of the field voltage computation unit 12.

The output value Ec of the output voltage computation unit 13 is supplied to the power conversion controller 14 as the basis for generating an output value of the power conversion controller 14. The power conversion controller 14 controls the electric power converter 2 according to the output voltage target Ec supplied from the output voltage computation unit 13.

The electric power converter 2 is a two-way inverter, and outputs an AC voltage based on a control signal output from the power conversion controller 14. The power conversion controller 14 controls the electric power converter 2, so that the output voltage of the electric power converter 2 becomes equal to the output voltage target Ec supplied to the power conversion controller 14.

Figure 2B:
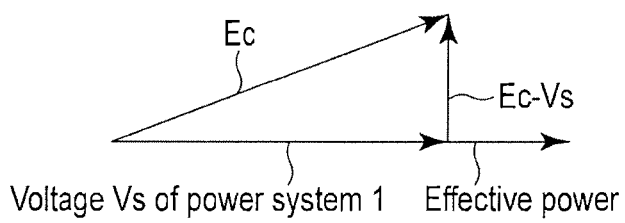
FIG. 2B is a diagram showing an example of the relationship between the output voltage and effective power of a photovoltaic generation system.

The output voltage target Ec is a sine wave, for example. As shown in FIG. 2A, when the output voltage is in a leading phase with respect to the voltage of the power system 1, effective power flows from the electric power converter 2 to the power system 1. As shown in FIG. 2B, when a phase difference with respect to the voltage of the power system 1 increases, the value of Ec−Vs increases, and greater effective power flows.

The voltage detected by the voltage detector 5 increases when the output voltage of the electric power converter 2 increases, and decreases when the output voltage of the electric power converter 2 decreases. In other words, by changing the phase angle and magnitude of the output voltage target Ec independently, the effective power flowing from the electric power converter 2 and the close voltage $V_T$ of the electric power converter 2 can be independently controlled.

Figure 3:
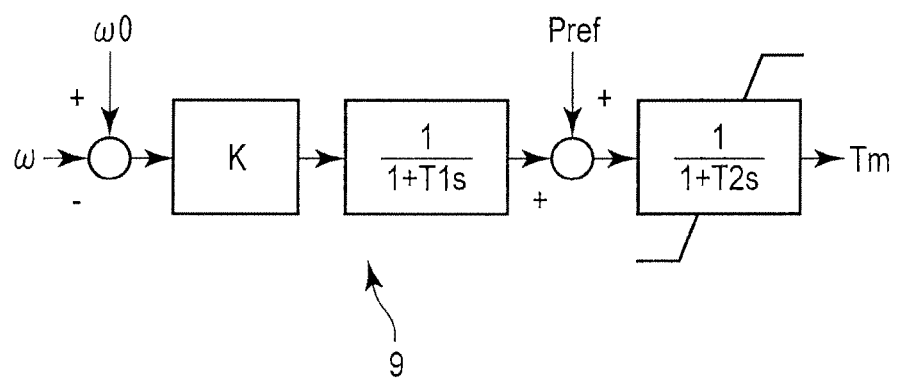
FIG. 3 is a diagram for explaining an example of a configuration of a mechanical output computation unit of the photovoltaic generation system shown in FIG. 1.

Hereinafter, an explanation will be given of the power generator characteristics computation unit 20 which generates the output voltage target Ec. The effective power setting unit 8 outputs an effective power set value Pref to be output from the electric power converter 2. The mechanical output computation unit 9 corresponds to a controller called a governor of a synchronous generator, and is configured to realize the control block diagram shown in FIG. 3, for example. The mechanical output computation unit 9 receives the output value (effective power set value) Pref of the effective power setting unit 8 and the angular frequency ω that is an output value of the rotor speed computation unit 10, as input signals, and computes a mechanical output Tm (corresponding to a mechanical torque) of a synchronous generator. When the angular frequency ω decreases to lower than a fundamental angular frequency ω0, an input to a gain K becomes a positive value, and finally the mechanical output Tm increases. Contrarily, when the angular frequency ω increases to higher than a fundamental angular frequency ω0, the input to the gain K becomes a negative value, and finally the mechanical output Tm decreases.

Figure 4:
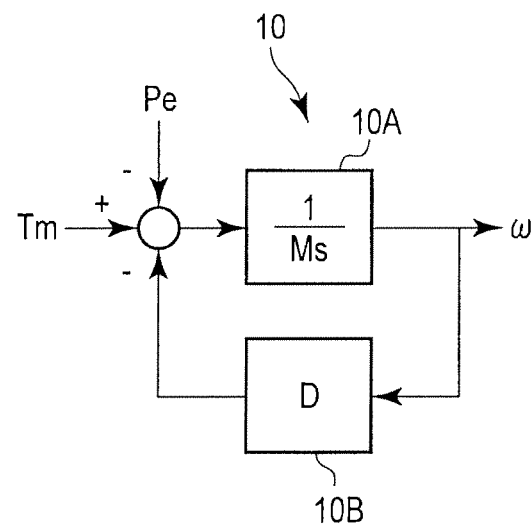
FIG. 4 is a diagram for explaining an example of a configuration of a rotor speed computation unit of the photovoltaic generation system shown in FIG. 1.

The rotor speed computation unit 10 computes a motion equation of a synchronous generator. The rotor speed computation unit 10 is configured to realize the block diagram shown in FIG. 4, for example. In FIG. 4, a constant M of a block 10A corresponds to an inertia constant of a power generator including a turbine, and a coefficient D of a block 10B corresponds to a damping coefficient. When the mechanical output Tm is constant, if the effective power value Pe is decreased by a decrease in the load of the power system 1, an input to the block 10A becomes a positive value, and the angular frequency ω increases at a change rate corresponding to the inertia constant M and damping coefficient D. Contrarily, when the effective power value Pe is increased by an increase in the load of the power system 1, the input to the block 10A becomes a negative value, and the angular frequency ω decreases at a change rate corresponding to the inertia constant M and damping coefficient D.

When the effective power value Pe is constant and the mechanical output Tm changes, the polarity is reversed. Therefore, the angular frequency decreases when the mechanical output Tm decreases, and increases when the mechanical output Tm increases.

The rotor speed computation unit 10 computes the angular frequency ω in a synchronous generator, as described above. The mechanical output computation unit 9 decreases the mechanical output Tm when the angular frequency ω increases, and increases it when the angular frequency ω decreases, functioning to prevent fluctuations in the angular frequency ω.

The angular frequency ω computed by the rotor speed computation unit 10 is supplied to the electrical characteristics computation unit 21. The electrical characteristics computation unit 21 comprises a voltage setting unit 11, a field voltage computation unit 12, and an output voltage computation unit 13.

Figure 5:
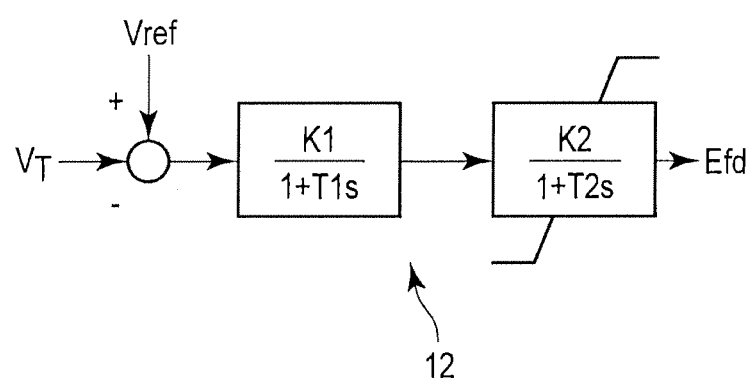
FIG. 5 is a diagram for explaining an example of a configuration of a field voltage computation unit of the photovoltaic generation system shown in FIG. 1.

The voltage setting unit 11 outputs a voltage set value Vref as a target of the close voltage $V_T$ of the electric power converter 2. The field voltage computation unit 12 corresponds to an excitation system of a synchronous generator, and is configured to realize the control block shown in FIG. 5.

The field voltage computation unit 12 computes a field voltage equivalent value Efd of a synchronous generator, according to the difference (Vref−$V_T$) between the set voltage value Vref and the close voltage $V_T$ of the electric power converter 2 obtained by the voltage detector 5, and outputs the computed value to the output voltage computation unit 13. When the close voltage $V_T$ is lower than the voltage set value Vref (Vref−$V_T$>0), a first order lag input becomes a positive value, and the field voltage equivalent value Efd increases. Contrarily, when the close voltage $V_T$ is higher than the voltage set value Vref (Vref−$V_T$<0), a first order lag input becomes a negative value, and the field voltage equivalent value Efd decreases.

The output voltage computation unit 13 computes an electrical characteristic formula, a so-called a Park's equation, of a synchronous generator. The output voltage computation unit 13 receives the field voltage equivalent value Efd output from the field voltage computation unit 12, the angular frequency ω output from the rotor speed computation unit 10, and the output current of the electric power converter 2 obtained by the current detector 6, as input values, and computes a generator terminal voltage equivalent value.

A voltage phase angle is obtained from the product (ωt) of the angular frequency ω and time, and when the frequency of the power system 1, or the angular frequency ω is decreased by an increase in the load, the angular frequency ω is controlled to be returned to a value close to the fundamental angular frequency ω0 by the actions of the mechanical output computation unit 9 and rotor speed computation unit 10. Therefore, the difference between the phase angle of the output voltage target Ec and the voltage phase angle of the power system 1 increases in a leading direction, and the power supply to the power system 1 increases, and functions to prevent a frequency decrease in the power system 1. Contrarily, when the frequency of the power system 1, or the angular frequency ω is increased by a decrease in the load, the difference between the phase angle of the output voltage target Ec and the voltage phase angle of the power system 1 decreases in a leading direction, and the power supply to the power system 1 decreases, and functions to prevent a frequency increase in the power system 1.

The value of the output voltage target Ed obtained by the output voltage computation unit 13 varies in the same direction as the field voltage equivalent value Efd output from the field voltage computation unit 12, and when the voltage of the power system 1 decreases, the field voltage equivalent value Efd increases, and the output voltage target Ec also increases, and functions to prevent a voltage decrease in the power system 1. Contrarily, when the voltage of the power system 1 increases, the field voltage equivalent value Efd decreases, and the output voltage target Ec also decreases, and functions to prevent a voltage increase in the power system 1.

Figure 6:
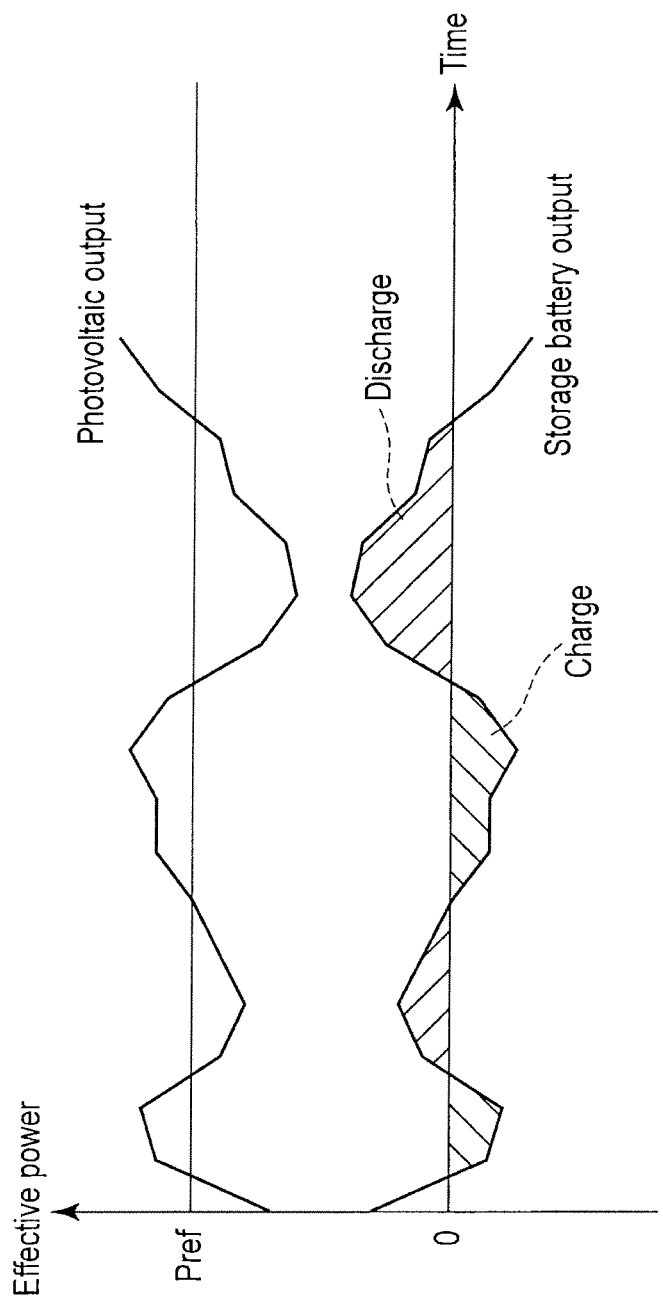
FIG. 6 is a graph showing an example of the relationship between an output of a photovoltaic, an effective power set value, and an output of a storage battery.

The power flowing from the electric power converter 2 to the power system 1 is supplied from the photovoltaic 3 and storage battery 4. As the power of the photovoltaic 3 varies according to the amount of solar irradiation, when constant power is supplied from the electric power converter 2 to the power system 1, a difference arises between the power to be supplied to the power system 1 and the generated power of the photovoltaic 3, and the power becomes excessive or insufficient. As shown in FIG. 6, The excess or insufficiency is compensated by charging or discharging the storage battery 4.

When the voltage obtained by the voltage detector 5 is not automatically controlled to be a specified value, or when a voltage fluctuation due to an increase or decrease in the effective power is allowed, the field voltage computation unit 12 can be omitted by setting the field voltage equivalent value Efd by the voltage setting unit 11. Further, when only the characteristics of a synchronous generator are necessary and the control of fluctuations in the angular frequency ω is unnecessary, the mechanical output computation unit 9 can be omitted by setting the mechanical output Tm by the effective power setting unit 8.

In the photovoltaic generation system according to the embodiment, the power conversion controller 14 controls the output voltage of the electric power converter 2 based on the motion equation of a synchronous generator, the electrical characteristic formula (Park's equation), and the outputs of the governor as a controller of a synchronous generator and power generator characteristics computation unit 20 which computes the excitation system characteristics, and the electric power converter 2 operates substantially as a asynchronous generator with respect to a voltage or frequency change in the power system 1. Further, effective power can be obtained according to schedule, and the system can be handled substantially as a synchronous generator.

Figure 7:
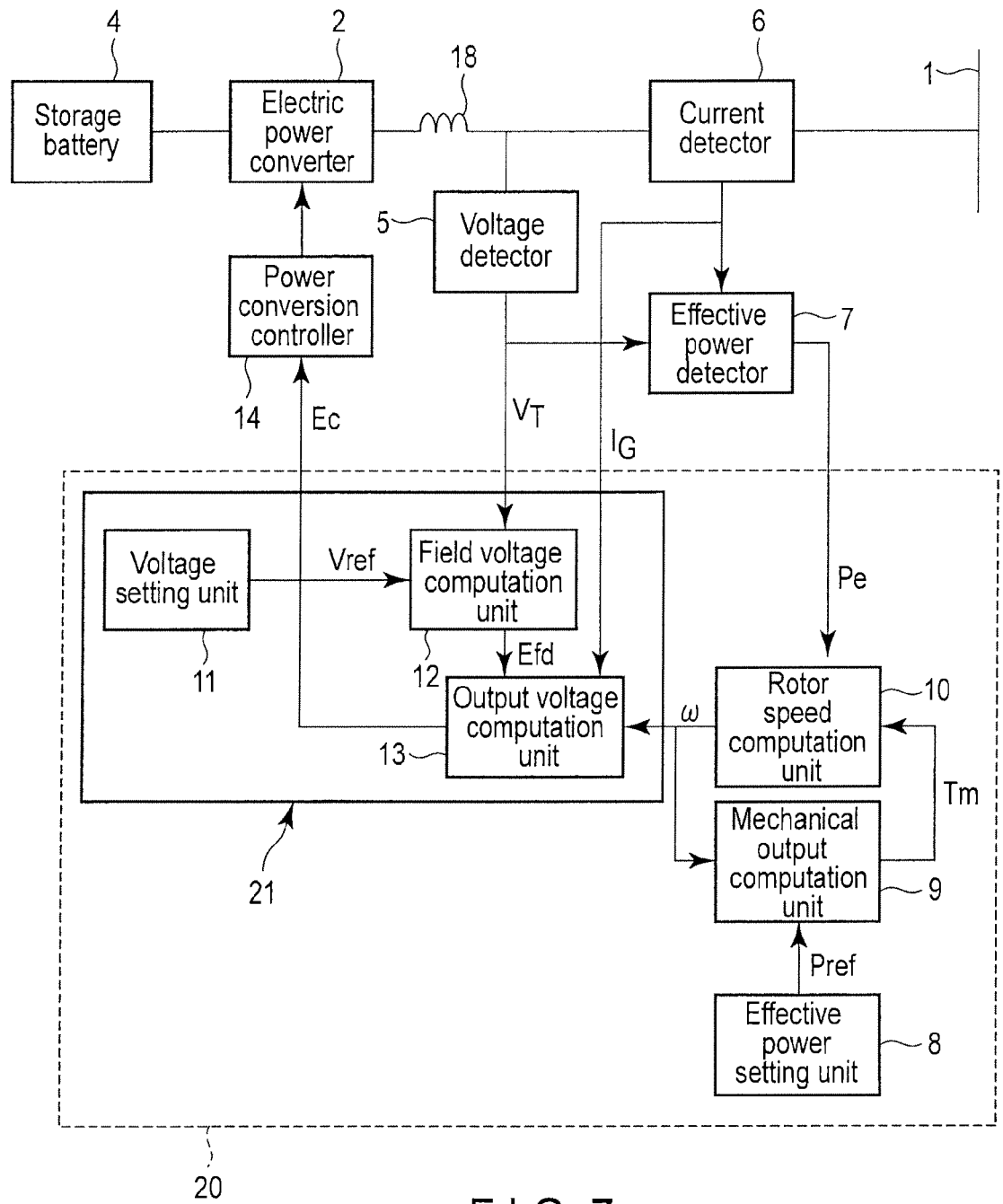
FIG. 7 is a block diagram for explaining another example of a configuration of the first embodiment.

As shown in FIG. 7, the system may be configured as a power feeding system not provided with a photovoltaic 3. Power to the electric power converter 2 is supplied from the storage battery 4 which charges power from the power system 1. In this case, plurality of processes described above may be adopted not only when the storage battery 4 feeds power to the power system 1, but also when the power system 1 feeds power to the storage battery 4.

As described above, the photovoltaic generation system and power feeding system according to the embodiment can be handled almost as a synchronous generator from the viewpoint of monitoring and controlling the whole power system. Even when cooperating with a power system, it is possible to provide a photovoltaic generation system and power feeding system capable of supplying stable power.

Next, a photovoltaic generation system and power feeding system according to a second embodiment will be explained in detail with reference to the accompanying drawings. In the following explanation, the same components as those of the photovoltaic generation system and power feeding system according to the first embodiment are given the same reference numbers, and an explanation thereof is omitted.

Figure 8:
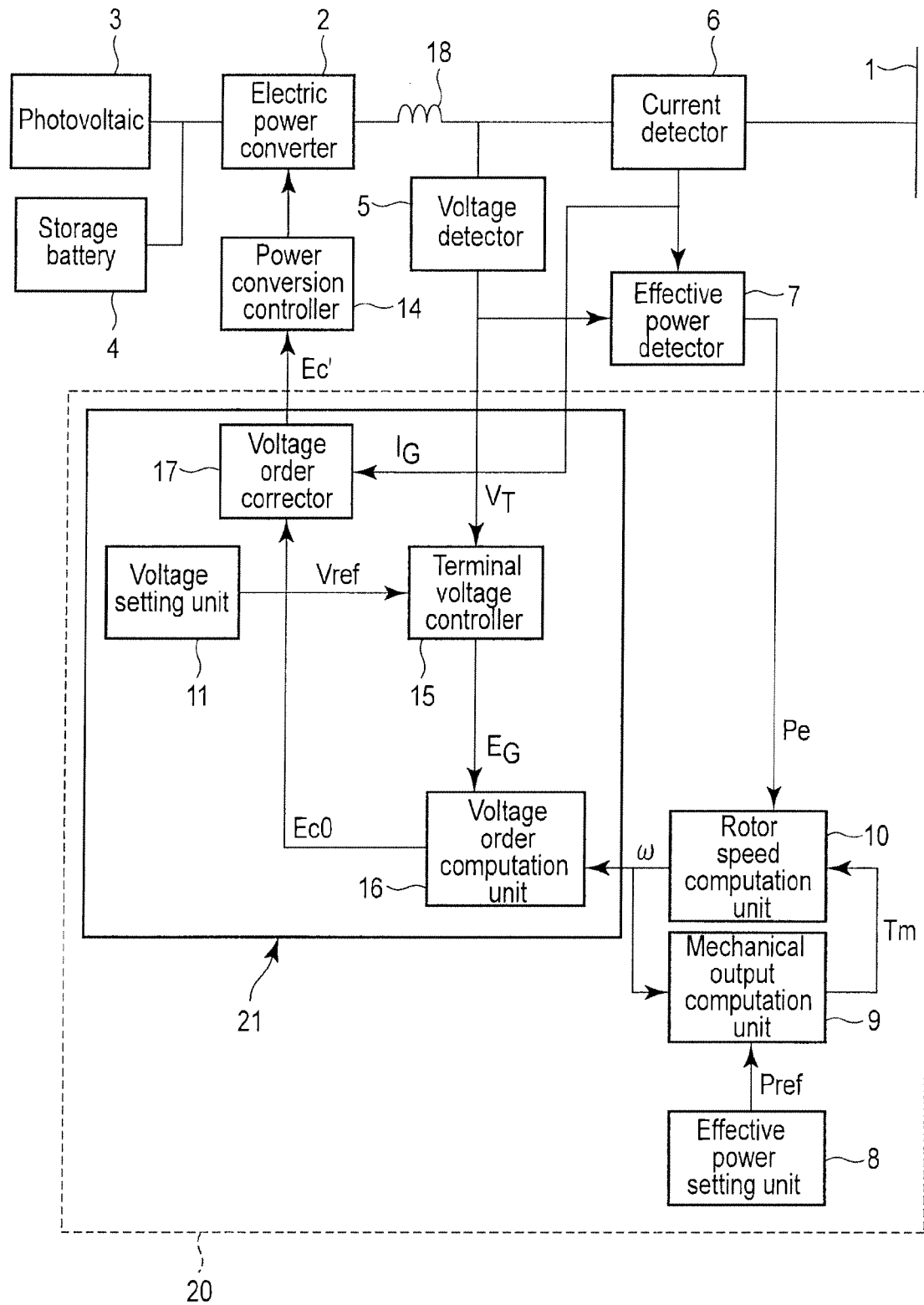
FIG. 8 is a block diagram for explaining an example of a configuration of a photovoltaic generation system according to a second embodiment.

The photovoltaic generation system and power feeding system according to the second embodiment are different from the systems of the first embodiment in the configuration of the electrical characteristics computation unit 21 of the power generator characteristics computation unit 20. As shown in FIG. 8, in the second embodiment, the electrical characteristics computation unit 21 comprises a voltage setting unit 11, a terminal voltage controller 15 supplied with a set value Vref output from a voltage setting unit 11 and a voltage value (close voltage value) $V_T$ output from a voltage detector 5, a voltage order computation unit 16 supplied with an output value $E_G$ of the terminal voltage controller 15 and an output value ω of a rotor speed computation unit 10, and a voltage order corrector 17 supplied with an output value Ec0 of the voltage order computation unit 16. The voltage order corrector 17 is supplied with the output value Ec0 of the voltage order computation unit 16 and the current value $I_G$ output from a current detector 6, and sends an output voltage order signal Ec' to a power conversion controller 14.

Figure 9:
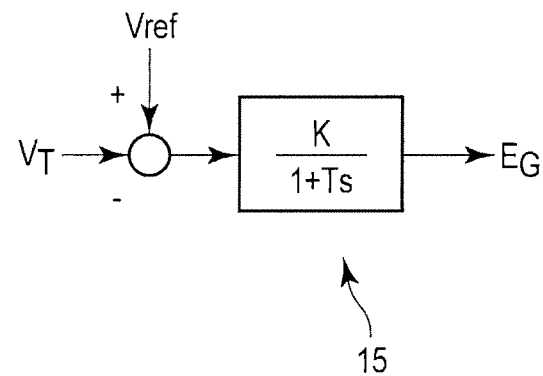
FIG. 9 is a diagram for explaining an example of a configuration of a terminal voltage control unit of the photovoltaic generation system shown in FIG. 8.

The terminal voltage controller 15 computes the amplitude $E_G$ of the output voltage of the electric power converter 2, so that the close voltage $V_T$ output from the voltage detector 5 becomes equal to the set value Vref output from the voltage setting unit 11. The terminal voltage controller 15 is configured to realize the transfer function shown in FIG. 9, for example.

The voltage order computation unit 16 computes a voltage to be output from the electric power converter 2, from the output value $E_G$ of the terminal voltage controller 15 and the output value ω of the terminal voltage controller 15. The output voltage Ec0 of the voltage order computation unit 16 can be obtained by the following equation (1), for example. The equation (1) provides a voltage order value for one phase. To obtain a value for three phases, compute a voltage order value having a phase difference of ±120° in addition to the equation (1).

$$Ec0 = EG \cdot \sin \omega t \qquad (1)$$

Figure 10:
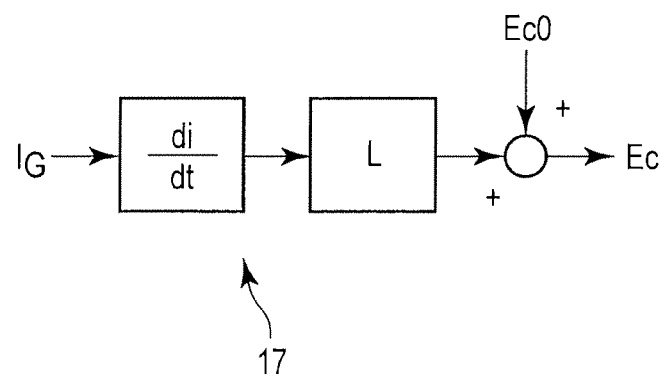
FIG. 10 is a diagram for explaining an example of a configuration of a voltage order corrector of the photovoltaic generation system shown in FIG. 8.

The voltage order corrector 17 corrects the output value Ec0 of the voltage order computation unit 16 based on the output value $I_G$ of the current detector 6. The correction compensates a voltage drop in the smoothing reactor 18 connected to the outside, assuming that the output voltage of the electric power converter 2 is equivalent to the output of a synchronous generator. The voltage order corrector 17 is configured to realize the block diagram shown in FIG. 10, for example. The constant L in FIG. 10 is the value equivalent to the difference between the internal inductance of a synchronous generator simulating the characteristics and the inductance of the smoothing reactor 18.

The terminal voltage controller 15 computes the amplitude $E_G$ of the output voltage, which makes the close voltage $V_T$ equal to the set value Vref. The rotor speed computation unit 10 computes the angular frequency ω of a synchronous generator from the mechanical output Tm obtained from the mechanical output computation unit 9 and the effective power value Pe obtained by the effective power detector 7. The voltage order computation unit 16 computes a first output voltage order Ec0 by using the output voltage amplitude $E_G$ and angular frequency ω.

The voltage order corrector 17 computes a new output voltage order Ec' by correcting the first output voltage order Ec0 by a voltage drop in the smoothing reactor 18 obtained from the current value $I_G$ obtained by the current detector 6 and the constant L, and supplies the output voltage order Ec' to the power conversion controller 14. The power conversion controller 14 controls the electric power converter 2, so that the output voltage order Ec' becomes equal to the output voltage of the electric power converter 2.

The first output voltage order Ec0 before correction is obtained from the output voltage amplitude $E_G$, which makes the angular frequency ω output from the rotor speed computation unit 10 and the close voltage (terminal voltage) $V_T$ equal to the set value Vref, as expressed by the equation (1). Therefore, the electric power converter 2 operates almost as a synchronous generator with respect to a voltage or frequency change in the power system 1, as in the first embodiment.

When the voltage obtained by the voltage detector 5 is not automatically controlled to be a specified value, or when a voltage fluctuation due to an increase or decrease in the effective power is allowed, the terminal voltage controller 15 can be omitted by setting the output voltage amplitude $E_G$ by the voltage setting unit 11.

When fluctuations in the angular frequency ω can be controlled only by the characteristics of a power generator, the mechanical output computation unit 9 can be omitted by setting the mechanical output Tm by the effective power setting unit 8. Further, by making the internal reactance of a synchronous generator simulating the characteristics of the smoothing reactor 18 equal to the reactance of the smoothing reactor 18, the voltage order corrector 17 can be omitted by inputting the output of the voltage order computation unit 16 to the power conversion controller 14.

Figure 11:
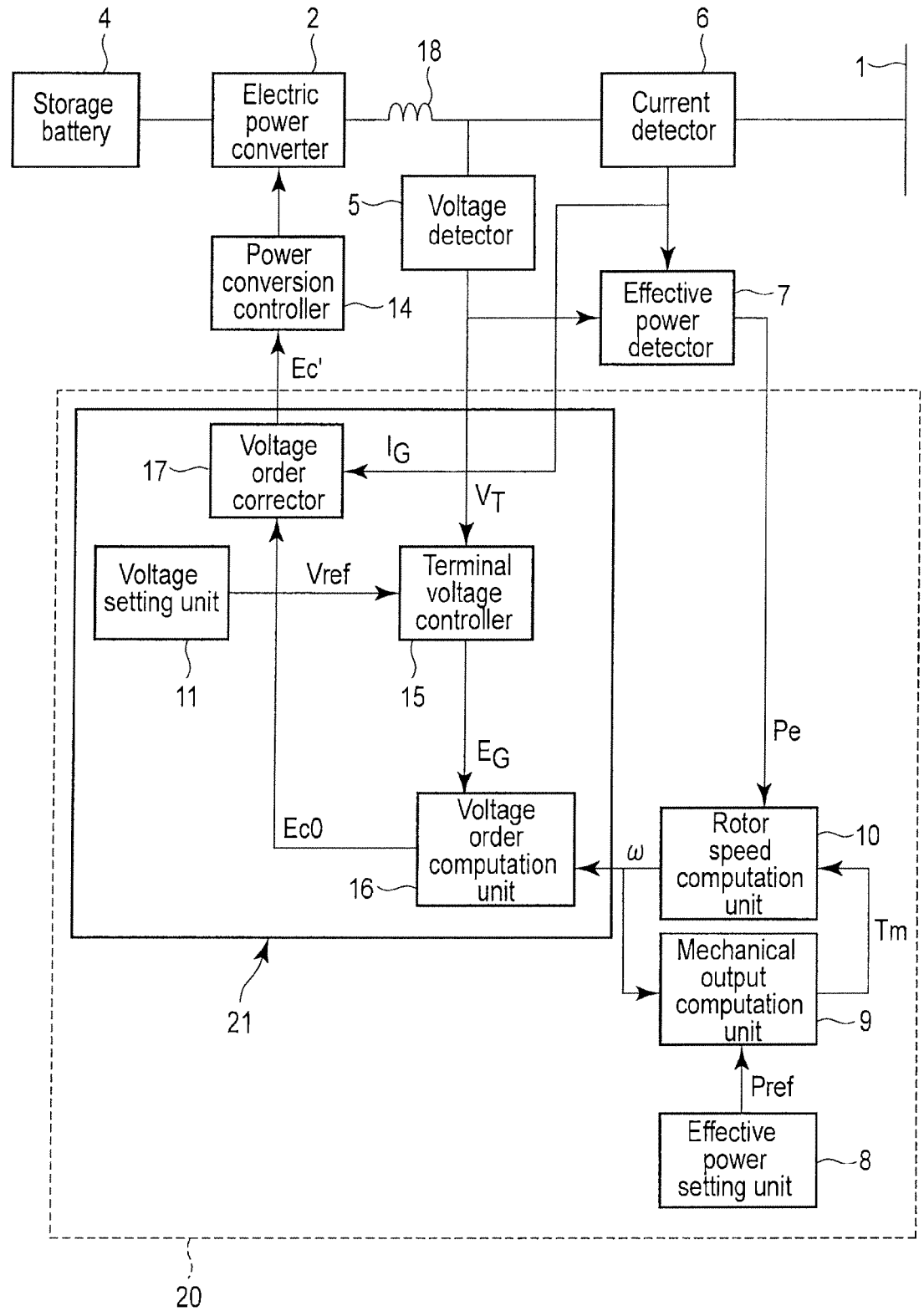
FIG. 11 is a block diagram for explaining another example of the configuration of the second embodiment.

As shown in FIG. 11, the system may be configured as a power feeding system not provided with a photovoltaic 3. Power to the electric power converter 2 is supplied from the storage battery 4 which charges power from the power system 1. In this case, plurality of processes described above may be adopted not only when the storage battery 4 feeds power to the power system 1, but also when the power system 1 feeds power to the storage battery 4.

As described hereinbefore, by simplifying the content of the generator characteristics computation unit 20 simulating the characteristics of a synchronous generator, it is possible to add characteristics similar to those of a synchronous generator to a photovoltaic generation system and power feeding system, by fewer computations. Further, as effective power can be output according to schedule, the system can be operated and handled almost as a synchronous generator. In other words, according to the embodiment, it is possible to provide a photovoltaic generation system and power feeding system, which can be handled almost as a synchronous generator from the viewpoint of monitoring the whole power system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A photovoltaic generation system comprising:
   a direct-current power supply, which includes a photovoltaic, and a storage battery to charge the power from the photovoltaic, and discharge a direct-current power to an electric power converter;
   the electric power converter configured to convert a direct-current power output from the direct-current power supply, and supply the converted power to a power system;
   a voltage detector configured to detect a voltage at a connection point between the electric power converter and power system;
   a current detector configured to detect a current output from the electric power converter;
   an effective power detector configured to detect effective power from a voltage value detected by the voltage detector and a current value detected by the current detector;
   a rotor speed computation circuit configured to compute an angular frequency of a voltage output from the electric power converter, in order to increase the angular frequency when the effective power value is decreased and decrease the angular frequency when the effective power value is increased, based on an effective power value detected by the effective power detector, and an effective power set value to be output from the electric power converter;

an electrical characteristics computation circuit configured to compute an output voltage target value of the electric power converter, in order to increase a difference between the phase angle of the output voltage target and the voltage phase angle of the power system in a leading direction when the frequency of the power system is decreased, based on the current value detected by the current detector, a set voltage value which is a reference value as a target of the close voltage of the electric power converter, and the angular frequency; and a power conversion controller configured to control the electric power converter according to the output voltage target value.

2. The photovoltaic generation system according to claim 1, wherein the electrical characteristics computation circuit is further supplied with the voltage value detected by the voltage detector, and the electrical characteristics computation circuit comprises a field voltage computation circuit configured to compute and output a field voltage equivalent value based on the voltage value detected by the voltage detector and the set voltage value, and an output voltage computation circuit configured to compute an output voltage target value of the electric power converter based on the current value detected by the current detector, the angular frequency, and the field voltage equivalent value.

3. The photovoltaic generation system according to claim 1, wherein the electrical characteristics computation circuit comprises a voltage order computation circuit configured to compute a first output voltage target based on the angular frequency and an output voltage amplitude, and a voltage order corrector configured to correct the first output voltage target based on the current value detected by the current detector, and output an output voltage target.

4. The photovoltaic generation system according to claim 1, wherein the electrical characteristics computation circuit is further supplied with the voltage value detected by the voltage detector, and the electrical characteristics computation circuit comprises a terminal voltage controller configured to calculate an output voltage amplitude to make the voltage value detected by the voltage detector equal to a set voltage value; a voltage order computation circuit configured to calculate a first output voltage target based on the angular frequency and output voltage amplitude; and a voltage order corrector configured to correct the first output voltage target based on the current value detected by the current detector, and output an output voltage target.

5. The photovoltaic generation system according to claim 1, further comprising a mechanical output computation circuit configured to calculate a mechanical output of a synchronous generator, based on an output of the effective power setting circuit, and an output of the rotor speed computation circuit, wherein the rotor speed computation circuit is configured to compute the angular frequency of a voltage output from the electric power converter, based on the mechanical output and an effective power value detected by the effective power detector.

6. The photovoltaic generation system according to claim 2, further comprising a mechanical output computation circuit configured to calculate a mechanical output of a synchronous generator, based on an output of the effective power setting circuit, and an output of the rotor speed computation circuit, wherein the rotor speed computation circuit is configured to compute the angular frequency of a voltage output from the electric power converter, based on the mechanical output and an effective power value detected by the effective power detector.

7. The photovoltaic generation system according to claim 3, further comprising a mechanical output computation circuit configured to calculate a mechanical output of a synchronous generator, based on an output of the effective power setting circuit, and an output of the rotor speed computation circuit, wherein the rotor speed computation circuit is configured to compute the angular frequency of a voltage output from the electric power converter, based on the mechanical output and an effective power value detected by the effective power detector.

8. The photovoltaic generation system according to claim 4, further comprising a mechanical output computation circuit configured to calculate a mechanical output of a synchronous generator, based on an output of the effective power setting circuit, and an output of the rotor speed computation circuit, wherein the rotor speed computation circuit is configured to compute the angular frequency of a voltage output from the electric power converter, based on the mechanical output and an effective power value detected by the effective power detector.

9. A power feeding system comprising:

a direct-current power supply including a storage battery which charges power, and discharges a direct-current power to an electric power converter;

the electric power converter which converts a direct-current power output from the direct-current power supply, and supplies the converted power to a power system;

a voltage detector configured to detect a voltage at a connection point between the electric power converter and power system;

a current detector configured to detect a current output from the electric power converter;

an effective power detector configured to detect effective power from a voltage value detected by the voltage detector and a current value detected by the current detector;

a rotor speed computation circuit configured to compute an angular frequency of the voltage output from the electric power converter, in order to increase the angular frequency when the effective power value is decreased and decrease the angular frequency when the effective power value is increased, based on an effective power value detected by the effective power detector and an effective power set value to be output from the electric power converter;

an electrical characteristics computation circuit configured to compute an output voltage target value of the electric power converter, in order to increase a difference between the phase angle of the output voltage target and the voltage phase angle of the power system in a leading direction when the frequency of the power system is decreased, based on the current value detected by the current detector and a set voltage value which is a reference value as a target of the close voltage of the electric power converter; and a power conversion controller configured to control the electric power converter according to the output voltage target value.

10. The power feeding system according to claim 9, wherein the electrical characteristics computation circuit is further supplied with the voltage value detected by the voltage detector, the electrical characteristics computation circuit comprises a field voltage computation circuit configured to compute and output a field voltage equivalent value, based on the voltage value detected by the voltage detector and the set voltage value, and an output voltage computation circuit configured to compute an output voltage target value of the electric power converter, based on the current value detected by the current detector, the angular frequency, and the field voltage equivalent value.

11. The power feeding system according to claim 9, wherein the electrical characteristics computation circuit comprises a voltage order computation circuit configured to compute a first output voltage target based on the angular frequency and an output voltage amplitude, and a voltage order corrector configured to correct the first output voltage target based on the current value detected by the current detector, and output an output voltage target.

12. The power feeding system according to claim 9, wherein the electrical characteristics computation circuit is further supplied with the voltage value detected by the voltage detector, and the electrical characteristics computation circuit comprises a terminal voltage controller configured to calculate an output voltage amplitude to make the voltage value detected by the voltage detector equal to a set voltage value, a voltage order computation circuit configured to calculate a first output voltage target based on the angular frequency and output voltage amplitude, and a voltage order corrector configured to correct the first output voltage target based on the current value detected by the current detector, output an output voltage target.

13. The power feeding system according to claim 9, further comprising a mechanical output computation circuit configured to calculate a mechanical output of a synchronous generator based on an output of the effective power setting circuit and an output of the rotor speed computation circuit, wherein the rotor speed computation circuit is configured to compute the angular frequency of a voltage output from the electric power converter, based on the mechanical output and an effective power value detected by the effective power detector.

14. The power feeding system according to claim 10, further comprising a mechanical output computation circuit configured to calculate a mechanical output of a synchronous generator based on an output of the effective power setting circuit and an output of the rotor speed computation circuit, wherein the rotor speed computation circuit is configured to compute the angular frequency of a voltage output from the electric power converter, based on the mechanical output and an effective power value detected by the effective power detector.

15. The power feeding system according to claim 11, further comprising a mechanical output computation circuit configured to calculate a mechanical output of a synchronous generator based on an output of the effective power setting circuit and an output of the rotor speed computation circuit, wherein the rotor speed computation circuit is configured to compute the angular, frequency of a voltage output from the electric power converter, based on the mechanical output and an effective power value detected by the effective power detector.

16. The power feeding system according to claim 12, further comprising a mechanical output computation circuit configured to calculate a mechanical output of a synchronous generator based on an output of the effective power setting circuit and an output of the rotor speed computation circuit, wherein the rotor speed computation circuit is configured to compute the angular frequency of a voltage output from the electric power converter, based on the mechanical output and an effective power value detected by the effective power detector.

17. A photovoltaic generation system comprising:
a direct-current power supply, which includes a photovoltaic, and a storage battery to charge the power from the photovoltaic, and discharge a direct-current power to an electric power converter;
the electric power converter configured to convert a direct-current power output from the direct-current power supply, and supply the converted power to a power system;
a voltage detector configured to detect a voltage at a connection point between the electric power converter and power system;
a current detector configured to detect a current output from the electric power converter;
an effective power detector configured to detect effective power from a voltage value detected by the voltage detector and a current value detected by the current detector; and
a processor configured to:
compute an angular frequency of a voltage output from the electric power converter, in order to increase the angular frequency when the effective power value is decreased and decrease the angular frequency when the effective power value is increased, based on an effective power value detected by the effective power detector, and an effective power set value to be output from the electric power converter;
compute an output voltage target value of the electric power converter, in order to increase a difference between the phase angle of the output voltage target and the voltage phase angle of the power system in a leading direction when the frequency of the power system is decreased, based on the current value detected by the current detector, a set voltage value which is a reference value as a target of the close voltage of the electric power converter, and the angular frequency; and
control the electric power converter according to the output voltage target value.

18. A power feeding system comprising:
a direct-current power supply including a storage battery which charges power, and discharges a direct-current power to an electric power converter;

the electric power converter which converts a direct-current power output from the direct-current power supply, and supplies the converted power to a power system;

a voltage detector configured to detect a voltage at a connection point between the electric power converter and power system;

a current detector configured to detect a current output from the electric power converter;

an effective power detector configured to detect effective power from a voltage value detected by the voltage detector and a current value detected by the current detector; and a processor configured to:

compute an angular frequency of the voltage output from the electric power converter, in order to increase the angular frequency when the effective power value is decreased and decrease the angular frequency when the effective power value is increased, based on an effective power value detected by the effective power detector and an effective power set value to be output from the electric power converter;

compute an output voltage target value of the electric power converter, in order to increase a difference between the phase angle of the output voltage target and the voltage phase angle of the power system in a leading direction when the frequency of the power system is decreased, based on the current value detected by the current detector and a set voltage value which is a reference value as a target of the close voltage of the electric power converter; and control the electric power converter according to the output voltage target value.

* * * * *